United States Patent
Okabe et al.

(10) Patent No.: US 6,743,134 B2
(45) Date of Patent: Jun. 1, 2004

(54) SILENT CHAIN

(75) Inventors: Isamu Okabe, Osaka (JP); Toshifumi Sato, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 104 days.

(21) Appl. No.: 10/087,307

(22) Filed: Mar. 1, 2002

(65) Prior Publication Data

US 2002/0160871 A1 Oct. 31, 2002

(30) Foreign Application Priority Data

Mar. 12, 2001 (JP) ........................................ 2001/069237

(51) Int. Cl.⁷ ............................................. F16G 13/04
(52) U.S. Cl. ...................................... 474/213; 474/212
(58) Field of Search ................................ 474/212–215, 474/228–234, 216–218; 59/5, 78, 78.1

(56) References Cited

U.S. PATENT DOCUMENTS

| | | | | |
|---|---|---|---|---|
| 690,317 A | * | 12/1901 | Reynold | ...................... 474/213 |
| 1,020,180 A | * | 3/1912 | Belcher | ...................... 474/213 |
| 1,270,460 A | * | 6/1918 | Taylor | ......................... 474/157 |
| 1,496,298 A | * | 6/1924 | Chapman | ..................... 474/218 |
| 1,709,802 A | * | 4/1929 | Muller | ....................... 474/213 |

FOREIGN PATENT DOCUMENTS

| | | | | |
|---|---|---|---|---|
| EP | 1 234 999 A1 | * | 8/2002 | ........... F16G/13/04 |
| JP | 2000-329199 A | | 11/2000 | |

* cited by examiner

Primary Examiner—Marcus Charles
(74) Attorney, Agent, or Firm—Howson and Howson

(57) ABSTRACT

In a silent chain, wear of the connecting pins and bushings, and wear elongation of the chain itself, are suppressed by the formation of through holes in the approximate centers of the teeth of toothed link elements for relieving strains in the inner peripheries of the bushings due to press-fitting of the bushings into the toothed link elements. The shortest distances between the bushing hole on the one hand, and the through-hole, the outside tooth surface and the inside tooth surface, on the other hand, are made substantially equal to one another. The through holes also reduce the weights of the individual link elements and contribute to a reduction in overall weight of the chain.

1 Claim, 6 Drawing Sheets

# SILENT CHAIN

BACKGROUND OF THE INVENTION

This invention relates to a silent chain used for power transmission, in applications such as the timing drive of automobiles or motorcycles, or as a chain drive in a general purpose engine, a diesel engine or an industrial machine or the like. More specifically, the invention relates to a silent chain used as a timing chain in an engine.

An example of a conventional silent chain a bush-type silent chain 1 is shown in FIGS. 3(A) and 3(B). In this silent chain 1, guide plates 2, link assemblies 3 and intermediate link plates 6 are disposed adjacent one another in the direction of the width of the chain, but shifted longitudinally so that they are interleaved. The interleaved members are articulably connected with one another by connecting pins 7.

The guide plates 2 do not have teeth, but each guide plate has a pair of pin holes 2a as shown in FIG. 4. Each link assembly 3 comprises two inner link plates 4 each having a pair of teeth 4a, which mesh with the teeth of a sprocket, a pair of bushing holes 4b, and a pair of bushings 5, each press-fit into a bushing hole 4b, as shown in FIGS. 5(A) and 5(B). In the link assembly 3, the two inner link plates 4 are integrally connected and fixed to each other by two bushings 5. Further, each intermediate link plate 6 includes a pair of teeth 6a, which mesh with the teeth of a sprocket, and a pair of pin holes 6b, as shown in FIG. 6.

In the inner link plate 4, as shown in FIG. 5(A) and FIG. 7, a pair of teeth 4a are formed, each having an outside surface portion 4c and an inside surface portion 4d, a pair of bushing holes 4b, into each of which a bushing 5 is press-fit and fixed, a back surface portion 4e formed on the side opposite to the side where the pair of teeth 4a is formed, and a pair of shoulder portions 4f, each of which connects an outside surface portion 4c to the back surface portion 4e. The broken line P in FIG. 7 is a pitch line, which passes through the centers of the bushing holes 4b.

In the particular chain shown in FIG. 3(A), two intermediate link plates 6 are disposed centrally with respect to the width direction of the chain, link assemblies 3 are disposed on both outer sides of the intermediate link plates 6, and the guide plates 2 are disposed on both of the outermost sides of the chain. These elements are longitudinally shifted with respect to one another, and thereby interleaved, and are articulably connected to one another by connecting pins 7. In this case, the connecting pin 7 is press-fit into and fixed to the pin holes 2a of the guide plates 2 on both outermost sides in the chain, and in the intermediate link plates 6, the connecting pin 7 can extend through the pin holes 6b with play, or can be press-fit and fixed into the pin hole 6b.

Since the link assembly 3 is composed of plural link plates 4, the problem arises that, if the inner link plates are not light in weight, the weight of the silent chain becomes excessive. Further, the rigidity of the teeth of the inner link plates is high. Thus, when the chain meshes with the teeth of a sprocket during operation, tooth surfaces of each inner link plate collide with tooth surfaces of the sprocket and the collision shock is dispersed to the entire inner link plate, generating meshing noises of large amplitude.

In the inner link plates 4, which form the link assembly 3, the bushing 5 is press-fit into, and fixed to, the bushing hole 4b. Thus, the bushing hole 4b, formed in the inner link plate 4, is a size larger than the pin hole 6b in the intermediate link plate 6. As a result, the distance between the bushing hole 4b and the adjacent outer side portion of the inner link plate 4 becomes smaller than the corresponding distance in the intermediate link plate 6. In this case, as shown in FIG. 7, the shortest distance k' between the bushing hole 4b and the outside surface portion 4c, and the shortest distance l' between the bushing hole 4b and the inside surface portion 4d are comparatively small. However, the shortest distance w' between the bushing hole 4b and the tip of the tooth of the inner link plate is still relatively large. Accordingly, the distances l', k' and w' become unbalanced.

When the bushing 5 is press-fit into the bushing hole 4b in the inner link plate 4 to form a link assembly, the inner link plate 4 is usually deformed in the areas where the distance between the bushing hole 4b and the outer side portion is small. Accordingly, strain is generated in the inner diameter of the press-fit bushing 5. Since the back surface portion 4e and the shoulder portions 4f of the inner link plate 4 have no direct relationship to the meshing of the link plate teeth with the teeth of a sprocket, it is possible to suppress the strain generated in the inner diameter of the press-fit bushing by increasing the shortest distance m' between the bushing hole 4b, and the back surface portion 4e and the shortest distance n' between the bushing hole 4b, and the shoulder portions 4f. However, in the teeth 4a, the distances k' and l' cannot be correspondingly increased without affecting the meshing relationship between the teeth 4a and the teeth of the sprocket. Thus, when the distances k and l are small, and the distance w' is large, the inner diameter of the press-fit bushing 5 has different degrees of deformation in the areas corresponding to the distances k' and l' and the area corresponding to the distance w'. As a result nonuniform strains are generated, and the inside of the bushing deviates from true roundness. This problem arises because the relationships between the shortest distances and the plate thickness of the inner link plate have not been noted. Thus, the distances k' and l' may be too small compared to the plate thickness of the inner link plate. However, these problems can arise even when the plate thickness is increased.

When the roundness of the inner diameter of the bushing press-fit into the bushing hole deteriorates, if the link assembly is incorporated into a chain, the interfacial pressure between the surface of the connecting pin and the inner periphery of the bushing becomes nonuniform, or the connecting pin makes contact with the inner periphery of the bushing only on one side. Consequently, wear of the connecting pin and bushing, and resulting wear elongation of the chain are both accelerated.

SUMMARY OF THE INVENTION

Accordingly, a general object of this invention is to overcome the problems associated with the above-described conventional silent chain.

A more specific object of the invention is to provide a silent chain in which wear of the connecting pins and bushings, and wear elongation of the chain can be suppressed.

According to one aspect of the invention, the silent chain comprises a link assembly including at least two inner link plates, each link plate having a pair of teeth and a pair of bushing holes, the link plates being connected and fixed to one another by a pair of bushings, each said bushing being press-fit into bushing holes of all of said link plates of the link assembly, wherein each of the teeth of the inner link plates has a through-hole approximately in its center.

According to the invention, the deformation of the inside of a press-fit bushing can be made more uniform compared to the deformation in the case of conventional inner link plate lacking the through-holes. Accordingly, deviation from roundness in the inside of the bushing can be prevented.

Further, the through-holes reduce the weight of the inner link plates, and as a result, a weight reduction of the a reduction in the overall weight of the silent chain can be realized. Because of this weight reduction, when the silent chain meshes with the sprocket teeth the shock energy due to the collision between the tooth faces of the inner link plates and sprocket is reduced, so that the occurrence of high-amplitude meshing noises can be prevented, and wear of the tooth faces can be suppressed.

In the silent chain according to the invention, each tooth of the pair of teeth of an inner link plate is adjacent a bushing hole and includes an outside surface portion and an inside surface portion. The inner link plate is preferably formed so that the shortest distance between the bushing hole and the through-hole, the shortest distance between the bushing hole and the outside surface portion, and the shortest distance between the bushing hole and the inside surface portion, are substantially equal, and the respective shortest distances are equal to, or greater than, the plate thickness of the inner link plate. When the above-mentioned relationships between the shortest distances and the plate thickness are satisfied, deformation of the inner link plate during press-punching can be prevented. Moreover, reduction in vertical accuracy of the bushing hole with respect to the inner link plate, thus the reduction in vertical accuracy of the press-fit bushing therewith can be prevented. Further, in the press-fit bushings, deformation of the inner peripheries of the bushings becomes nearly uniform, so that deviations from roundness of the inner peripheries of the bushings can be prevented. As a result, since biased contact between the connecting pins and the inner peripheries of the bushings can be prevented, and at the same time interfacial pressure between the connecting pins and the inner peripheries of the bushings becomes uniform, wear of the connecting pins and bushings, and wear elongation of the chain, can be suppressed.

BRIEF DESCRIPTION OF THE DRAWINGS

Preferred embodiments of the invention will now be described in detail with reference to the accompanying drawings, in which.

DETAILED DESCRIPTION OF THE PREFERRED EMBODIMENTS

Figures 1A, 1B:
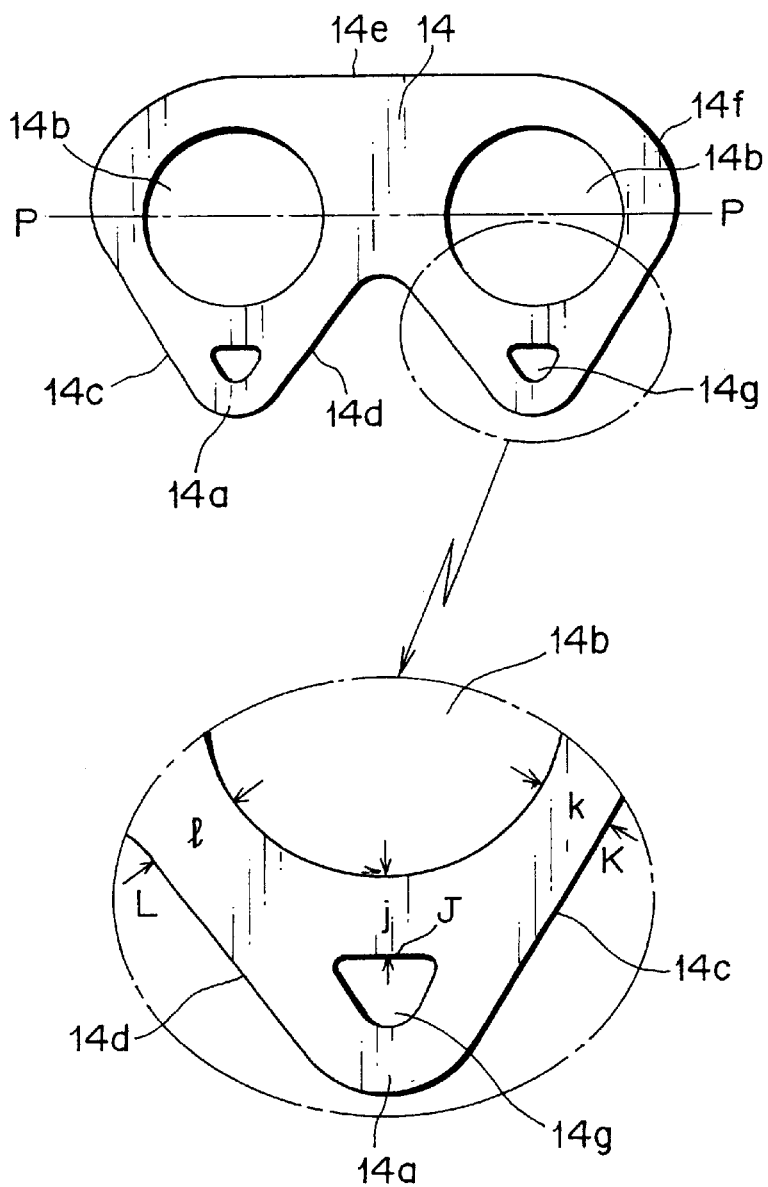
FIGS. 1(A) and 1(B) show an inner link plate according to a first embodiment of the invention, FIG. 1(A) being a cross-sectional view and FIG. 1(B) being a side elevational view.

The following description is merely exemplary in nature and is in no way intended to limit the invention or its application or uses.

The first embodiment of the invention will be described with reference to FIG. 1. A silent chain of the invention is substantially the same as the conventional silent chain shown in FIGS. 3 to 7 except that the link assembly of the invention is different from a conventional link assembly. Accordingly, no separate drawing or explanation need be provided to show or describe the structure of the chain in accordance with the invention. The corresponding members of the silent chain of the invention and the conventional silent chain are denoted by the same reference numerals and the description thereof will be omitted.

As in the case of the conventional silent chain, the silent chain in accordance with the first embodiment of the invention comprises, two intermediate link plates 6 disposed centrally with respect to the width direction of the chain, two link assemblies 3 respectively disposed on both outer sides of the intermediate link plates 6, and two guide plates 2 respectively disposed on the outermost sides of the link assemblies 3. The members are combined in interleaved relationship and articulately connected to one another by a connecting pin 7. The guide plate 2 does not have teeth, but has a pair of pin holes 2a. The intermediate link plate 6 includes a pair of teeth 6a, which mesh with the teeth of a sprocket, and a pair of pin holes 6b.

The link assembly 3 comprises, as in the conventional link assembly, two inner link plates, each having a pair of teeth, which mesh with the teeth of a sprocket, a pair of bushing holes, and a pair of bushings 5, each press-fit into bushing holes in both link plates. In the link assembly 3, the two inner link plates are integrally connected and fixed to each other by the two bushings 5.

FIG. 1 shows an inner link plate 14, which forms a link assembly according to the invention. A pair of teeth 14a is formed on the inner link plate 14, as shown in FIG. 1. Each tooth has an outside surface portion 14c and an inside surface portion 14d. A pair of bushing holes 14b are provided, into each of which a bushing 5 is press-fit and fixed. The link plate 14 has a back surface portion 14e formed on the side opposite to the side on which the pair of teeth 14a is formed, and a pair of shoulder portions 14f, each of which connects an outside surface portion 14c with the back surface portion 14e. Each shoulder portion 14f is in the form of an arc, which is substantially concentric with a bushing hole 14b.

Through holes 14g are formed substantially in the centers of teeth 14a of the inner link plate 14 to achieve a weight reduction of the inner link plate. In FIG. 1, j is the shortest distance between the bushing hole 14b and the through-hole 14g, k is the shortest distance between the bushing hole 14b and the outside surface portion 14c, and l is the shortest distance between the bushing hole 14b and the inside surface portion 14d. The through-hole 14g is of a substantially triangular shape, corresponding to the shape of the tooth 14a, and formed so that the shortest distances j, k, and l are substantially equal to one another, and related to the plate thickness t of the inner link plate 14 so that $j = k = l \geq t$.

When the inner link plate 14 is formed as described above, since strain is better dispersed than in the case where through-holes are not provided, the bushing 5, which is press-fit into the bushing hole 14b, has a substantially uniform deformation in its inner periphery at the locations adjacent to the positions of the shortest distances j, k, and l. Thus, deviation from roundness in the inner surface of the bushing is prevented. Accordingly, biased contact between the connecting pin and the inner periphery of the bushing is prevented and at the same time, interfacial pressure between the connecting pin and the inner periphery of the bushing becomes uniform, so that wear of the connecting pin and bushing can be prevented. As a result, wear elongation of the silent chain incorporating the link assembly is prevented. Further, since the shortest distances j, k and l are equal to or greater than the plate thickness t, deformation of the plate in the process of press-punching is prevented, and reduction in vertical accuracy of the bushing hole with respect to the plate is also prevented.

Figure 2:
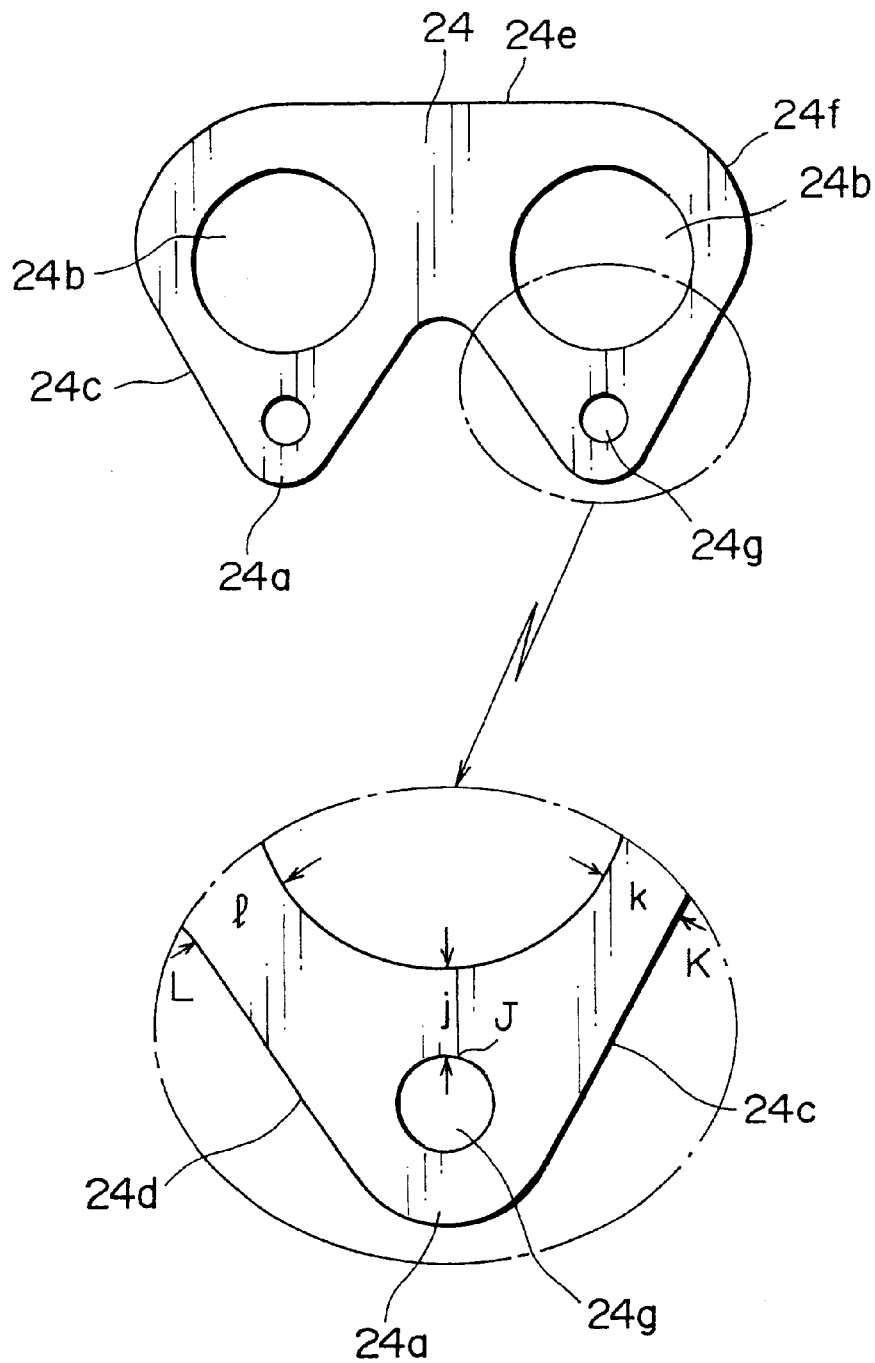
FIG. 2 is a side view of an inner link plate according to a second embodiment of the invention.
Figure 3A:
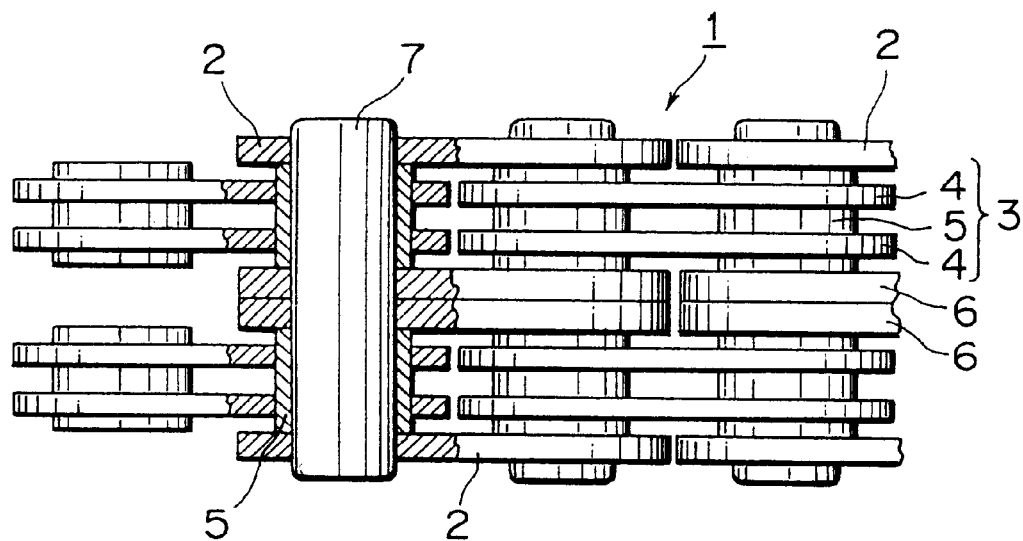
FIGS. 3(A) and 3(B) show a conventional silent chain, FIG. 3(A) being a fragmentary plan view partially in cross-section, and FIG. 3(B) being a fragmentary side view.
Figure 3B:
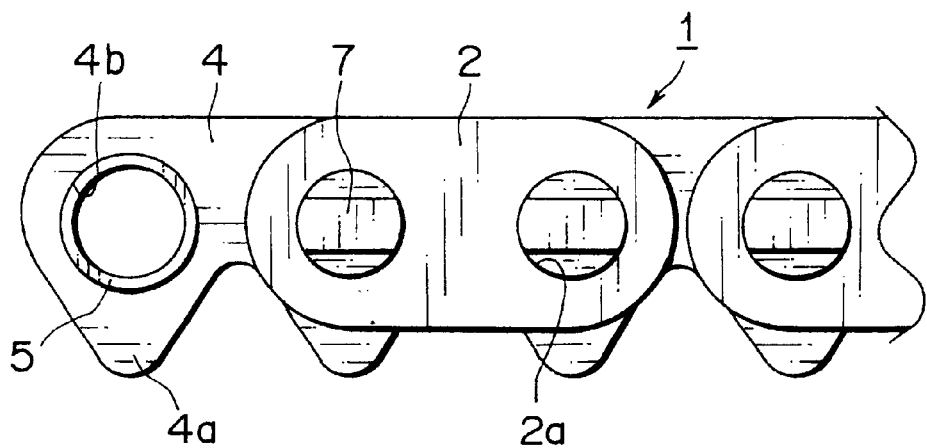
Figure 4:
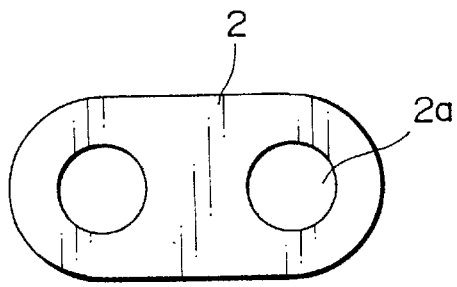
FIG. 4 is a side view of a guide plate.
Figure 5A:
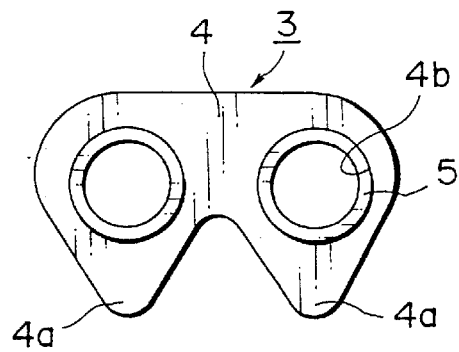
FIGS. 5(A) and 5(B) show a link assembly, FIG. 5(A) being a side view, and FIG. 5(B) being a cross-sectional view.
Figure 5B:
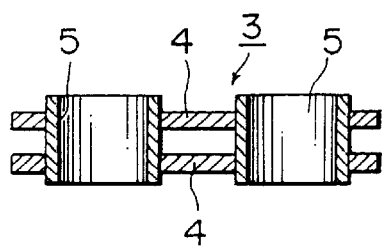
Figure 6:
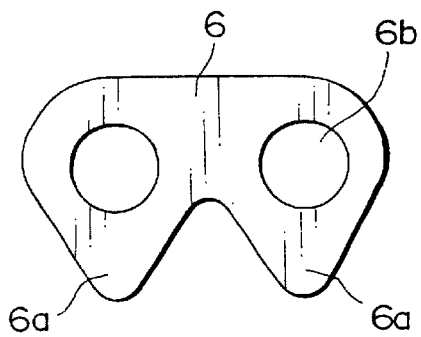
FIG. 6 is a side view of an intermediate link plate.

The second embodiment of the invention will be described with reference to FIG. 2. The silent chain in the second embodiment comprises, as in the silent chain of the first embodiment, two intermediate link plates 6, two link assemblies 3 respectively disposed on both outer sides of the intermediate link plates 6, and two guide plates 2 respectively disposed on the outermost sides of the link assemblies 3. The members are combined in interleaved relationship and articulately connected to one another by a connecting pin 7.

The link assembly 3 comprises, as in the conventional link assembly, two inner link plates, each having a pair of teeth, which mesh with the teeth of a sprocket, a pair of bushing holes, and a pair of bushings 5, each press-fit into bushing holes in both link plates. In the link assembly 3, the two inner link plates are integrally connected and fixed to each other by the two bushings 5.

Circular through-holes 24g are formed in the approximate centers of the teeth 24a of the inner link plate 24, as in the first embodiment. Each through-hole 24g is formed so that the shortest distances j, k, and l are substantially equal to each other and equal to or greater than the plate thickness t of the inner link plate 24. That is j=k=l≧t, where j is the shortest distance between the bushing hole 24b and the through-hole 24g, k is the shortest distance between the bushing hole 24b and the outside surface portion 24c, and l is the shortest distance between the bushing hole 24b and the inside surface portion 24d.

When the inner link plate 24 is formed as described above, since strain is better dispersed than in the case of a link plate lacking through-holes, the bushing 5, which is press-fit into the bushing hole 24b exhibits a substantially uniform degree of deformation in the inner periphery of the bushing 5 at the locations adjacent the positions, of the distances j, k, and l. Thus, deviation from roundness in the inner surface of the bushing is prevented. Accordingly, biased contact between the connecting pin and the inner periphery of the bushing is prevented and at the same time, interfacial pressure between the connecting pin and the inner periphery of the bushing becomes uniform, so that wear of the connecting pin and bushing can be prevented. As a result, wear elongation of the silent chain incorporating the link assembly is prevented.

The link assembly preferably comprises at least two link plates. In still another embodiment of the invention, not shown in the drawings, the link assembly may comprise three or more link plates instead of two link plates. Further, in a silent chain according to the invention, instead of two link assemblies in the width direction of the chain, three or more link assemblies may be disposed in the width direction. Further, one or a plurality of intermediate link plates may be provided, and intermediate link plates may be disposed at a plurality of positions.

Still another type of silent chain in accordance with the invention may have a guide plate 2 inside in the width direction of the chain, for example a centrally located guide plate. In this case, link assemblies 3 may be disposed on both sides of the guide plate 2, and outer link plates 6 may be disposed on the outermost sides of the respective link assemblies 3. The members are connected to one another in an interleaved relationship by a connection pin 7. In this case, when the silent chain is used as a transmission device with the silent chain wound around a sprocket, the sprocket will have an annular groove in its outer periphery for receiving the centrally located guide plate.

Figure 7:
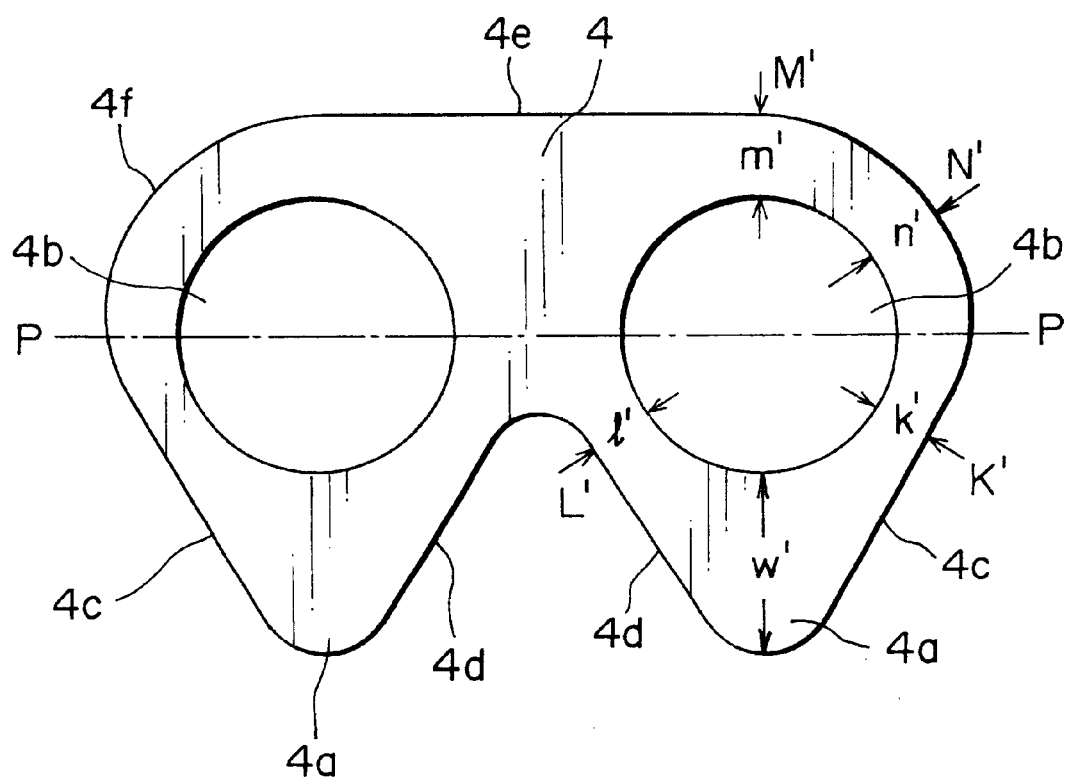
FIG. 7 is a side view of a conventional inner link plate.
Figure 8:
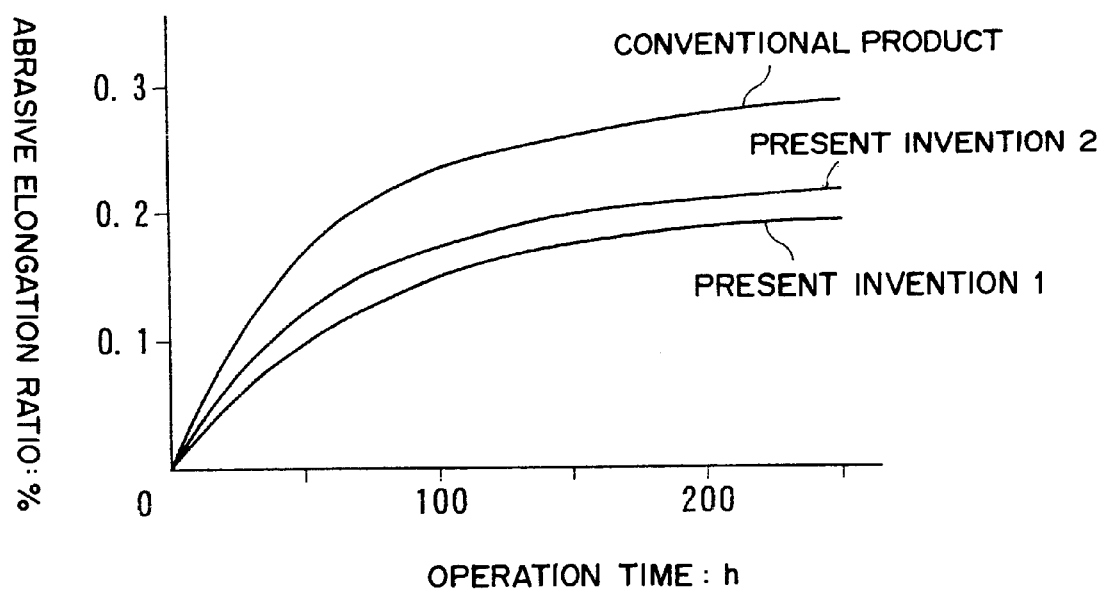
FIG. 8 is a graph showing results of a test comparing the elongation of silent chains in accordance with the invention with the elongation of a conventional chain.

FIG. 8 shows the results of test comparing the silent chains according to the first and second embodiments of the invention, having substantially triangular and circular through-holes, respectively, and a conventional silent chain having link plates of the type shown in FIG. 7. The silent chains in accordance with the invention differed from each other, and from the conventional chain only in the configurations of the inner link plates of the link assembly.

In the inner link plate, the intermediate link plate, and the guide plate in each of the three silent chains, the pitch measured between the centers of the pin holes (or the bushing holes) was about 9.525 mm. The diameter of the connecting pins was about 4.5 mm or less. The length of the bushings was about 4.5 mm. The bushing wall thickness was about 0.7 mm. The inner bushing diameter was about 4.5 mm or more. The clearance C, i.e., the total distance between the ends of the bushing and the guide plate and intermediate link plate, was about 0.1 mm.

In the inner link plates, of the link assemblies, in accordance with the first and second embodiments of the invention, the distances k, l, m', n', and j, and the plate thickness t were as follows:

| k: about 1.35 mm, | l: about 1.4 mm, | t; about 1.3 mm, |
| m: about 1.6 mm, | n; about 1.6 mm, | j; about 1.35 mm |

In the conventional product, the distances k', l', m', n', and the plate thickness t ware as follows:

| k': about 1.35 mm, | l' about 1.4 mm, | |
| m': about 1.6 mm, | n' about 1.6 mm, | t: about 1.3 mm. | j is the shortest distance between the bushing hole and the through-hole, k and k' are the shortest distances between the bushing hole and the outside surface portion, l and l' are the shortest distances between the bushing hole and the inside surface portion, m and m' are the shortest distances between the bushing hole and the back surface portion and n and n' are the shortest distances between the bushing hole and the shoulder portion.

The test conditions were as follows: The sprocket: 21NT× 42NT. The chain speed: about 19 m/s. The chain tension: about 1.8 kN. The chain lengths were measured over time after running the chain with continued lubrication. The elongation ratio compares the elongated length of the chain after the test to the initial length of the chain. As can be seen from FIG. 8, the silent chains in accordance with the first and second embodiments of the invention had a significantly superior elongation ratio compared with the elongation ratio exhibited by the conventional silent chain.

Obviously, various minor changes and modifications of the invention are possible in the light of the above teaching. It is therefore to be understood that within the scope of the appended claims, the invention may be practiced otherwise than as specifically described.

What is claimed is:

1. A silent chain comprising a link assembly including at least two inner link plates, each link plate having a pair of teeth and a pair of bushing holes, said link plates being connected and fixed to one another by a pair of bushings, each said bushing being press-fit into bushing holes of all of said link plates of the link assembly, wherein each of said teeth of the inner link plates has a through-hole approximately in its center, the through holes making strains in the bushings press-fit into the bushing holes more uniform, and wherein each tooth of said pair of teeth is adjacent a bushing hole and includes an outside surface portion and an inside surface portion, and said inner link plate is formed so that the shortest distance between the bushing hole and the through-hole, the shortest distance between the bushing hole and the outside surface portion and the shortest distance between the bushing hole and the inside surface portion are substantially equal and said respective shortest distances are at least equal to the plate thickness of the inner link plate.

* * * * *